UNITED STATES PATENT OFFICE.

EDWIN W. DALEY AND CHARLES JOHNSON, OF NASHVILLE, TENNESSEE, ASSIGNORS TO NASHVILLE CHEMICAL COMPANY, OF NASHVILLE, TENNESSEE, A CORPORATION OF TENNESSEE.

COMPOSITION OF MATTER FOR FIRE-KINDLING.

No. 846,554.     Specification of Letters Patent.     Patented March 12, 1907.

Application filed March 5, 1906. Serial No. 304,337.

*To all whom it may concern:*

Be it known that we, EDWIN W. DALEY and CHARLES JOHNSON, citizens of the United States, residing at Nashville, in the county of Davidson and State of Tennessee, have invented a new and useful Composition of Matter for Fire-Kindling; and we do hereby declare the following to be a full, clear, and exact description of the invention, such as will enable others skilled in the art to which it appertains to make and use the same.

The object of this invention is to produce an efficient and commercially-practicable kindling material in firm and cohesive solid form and adapted to be molded or compressed into briquets, cakes, blocks, or other desired form for marketing and using for kindling fires without necessitating the incorporation in the composition of any large proportion or excess of expensive cementing or binding material, the composition being also inexpensive in manufacture and having the desirable characteristics of quick inflammability and relatively prolonged and intense combustion.

To this end our composition consists of sawdust or other equivalent combustible filler combined with naphthalene, with which is desirably incorporated a relatively smaller proportion of cementing or binding material, such as rosin. For producing a firm cohesive article these ingredients are preferably combined in substantially the following proportions, viz: sawdust, six pounds; naphthalene, eight pounds, and rosin, two and one-half pounds. The naphthalene in flakes or solid masses and the lump rosin are put into a melting tank or kettle and heated in conjunction to a temperature of about 250° Fahrenheit until thoroughly melted and reduced to an oily liquid, being at the same time thoroughly commingled, whereupon the sawdust, which is of relatively larger bulk, is incorporated in and thoroughly commingled and impregnated with the hot liquid. The combined mixture is then placed in machine molds and preferably compressed therein to form the composition into bricks or cakes. These are allowed to remain in the molds for about five minutes, then removed and allowed to cool until the naphthalene has reverted to its original solid state and the bricks, cakes, or blocks are comparatively hard and in the form of firm solid articles.

The use of naphthalene in combination with the filler is particularly advantageous by reason of its cheapness and the characteristic of naphthalene of readily crystallizing or solidifying upon cooling, thereby making it unnecessary to employ cementing substances to hold the brick or molded article in shape and avoiding the expense of any excess or relatively large proportion of the rosin or other cementing material. Being a constituent of coal-tar and obtained in large quantities as a refuse or waste product from refineries, the naphthalene is so very inexpensive that its cost of production can be practically ignored, since it is merely one of the operating expenses of tar manufactories or refineries, and it is, moreover, used in its crude or impure state, (appearing as a dark-brownish solidified mass,) it being unnecessary to refine the naphthalene for the purpose of the kindling material. On the other hand, this inexpensive ingredient is exactly fitted for incorporation with the sawdust or other finely-divided filler, and for effecting cohesion and solidification therewith after the admixture of the filler with the molten liquid, the naphthalene being in solid form except under the influence of at least 250° Fahrenheit temperature, and immediately after the source of heat is removed the naphthalene begins to crystallize into its original form. When ignited, the material thus described rapidly inflames and burns with an intense heat and flame for a considerable period, making an excellent and thoroughly successful kindling material.

The proportions herein stated have been adopted by us as giving substantially the best and most practicable results; but such proportions may be considerably varied, and it will be understood, therefore, that we are not limited to the same or to any specific formula; and it will be further understood that other suitable substances or ingredients may be incorporated with the composition described.

Having thus fully described our invention, what we claim as new, and desire to secure by Letters Patent of the United States, is—

1. A kindling composition comprising naphthalene and a combustible filler, as sawdust or similar granular material, the larger proportion being naphthalene, combined together by incorporating the sawdust in the naphthalene while in molten state, the composition being pressed into blocks and solidified in that form.

2. A kindling composition comprising naphthalene and a combustible granular filler, as sawdust, of which the naphthalene is in the largest proportion, together with a relatively small proportion of a binding substance, as rosin, the said ingredients being combined together by incorporating the sawdust in a molten or hot liquid admixture of the naphthalene and rosin, and the composition being made into blocks of solid form.

In testimony whereof we affix our signatures in presence of two witnesses.

EDWIN W. DALEY.
CHARLES JOHNSON.

Witnesses:
NORMAN FARRELL, Jr.,
SIDNEY SMITH.